United States Patent [19]

Beeson

[11] Patent Number: 4,836,497
[45] Date of Patent: Jun. 6, 1989

[54] ADJUSTABLE VALVE LINKAGE

[75] Inventor: Charles F. Beeson, Goshen, Ind.

[73] Assignee: Johnson Controls, Inc., Milwaukee, Wis.

[21] Appl. No.: 165,638

[22] Filed: Mar. 8, 1988

[51] Int. Cl.⁴ .................. F16K 31/04; F16K 31/54; F16K 43/00
[52] U.S. Cl. ........................ 251/80; 74/581; 248/670; 248/674; 251/129.01; 251/250; 137/315
[58] Field of Search ............... 74/581, 586; 137/315; 251/79, 80, 250, 291, 292, 129.01, 129.03, 129.11; 248/670, 674

[56] References Cited

U.S. PATENT DOCUMENTS

| 780,060 | 1/1905 | Petsche | 251/80 |
|---|---|---|---|
| 891,697 | 6/1908 | Huff | 248/674 |
| 1,232,352 | 7/1917 | MacVicar | 251/80 |
| 1,534,137 | 4/1925 | Ostrander | 251/80 |
| 1,801,237 | 4/1931 | Hanson | 251/250 |
| 2,004,536 | 6/1935 | Olson et al. | 248/670 |
| 2,339,181 | 1/1944 | Martin | 248/670 |
| 2,631,800 | 3/1953 | Pinkston | 248/674 |
| 2,695,153 | 11/1954 | Gillaspy | 251/80 |
| 3,975,068 | 8/1976 | Speckin | 248/674 |
| 4,135,838 | 1/1979 | Vandenberg | 251/292 |
| 4,231,389 | 11/1980 | Still et al. | 251/250 |
| 4,313,595 | 2/1982 | Markley et al. | 251/292 |
| 4,549,446 | 10/1985 | Beeson | 137/270 |
| 4,633,897 | 1/1987 | Effenberger | 251/291 |

FOREIGN PATENT DOCUMENTS 686590 12/1939 Fed. Rep. of Germany ...... 248/674

Primary Examiner—George L. Walton
Attorney, Agent, or Firm—Foley & Lardner

[57] ABSTRACT

A valve actuator mechanism for supplying a selectively adjustable close-off force to an associated valve. The mechanism comprises a means for urging the valve plunger into engagement with the valve seat with a predetermined initial force and resistive means for generating a resistive force such that the close-off force is less than the initial by a predetermined amount. The resistive force can be selectively adjusted also.

12 Claims, 3 Drawing Sheets

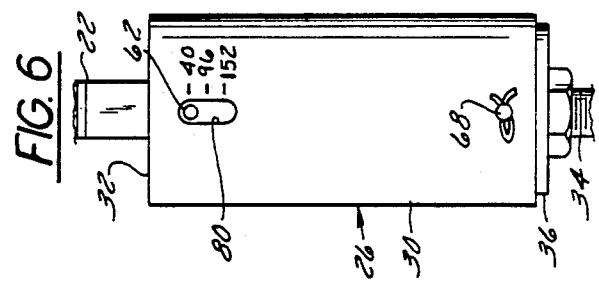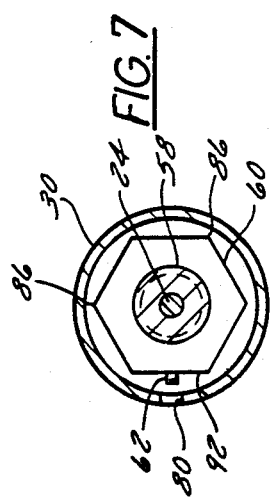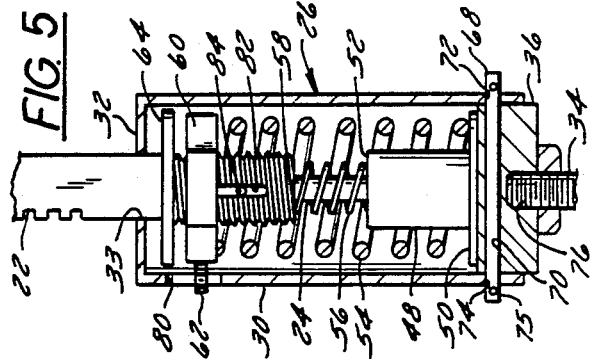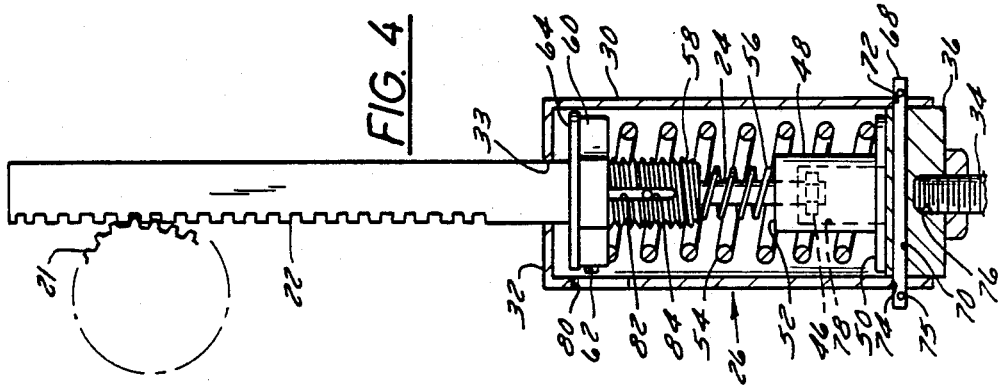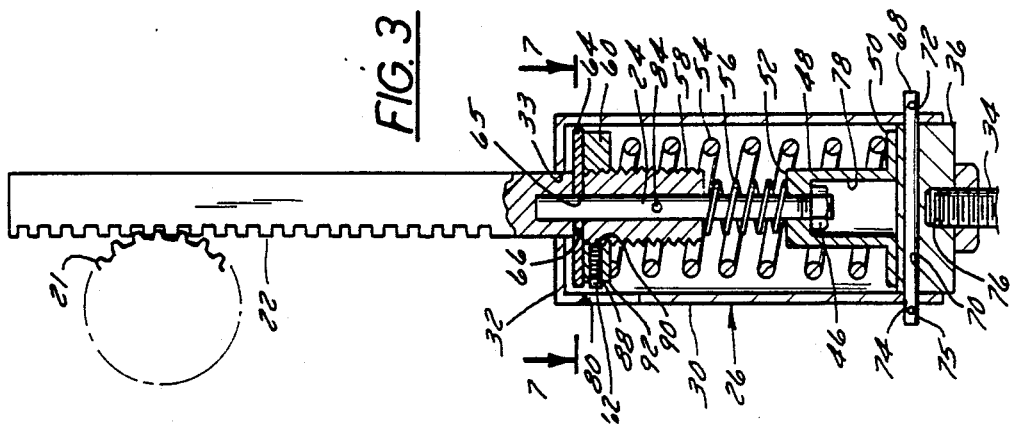

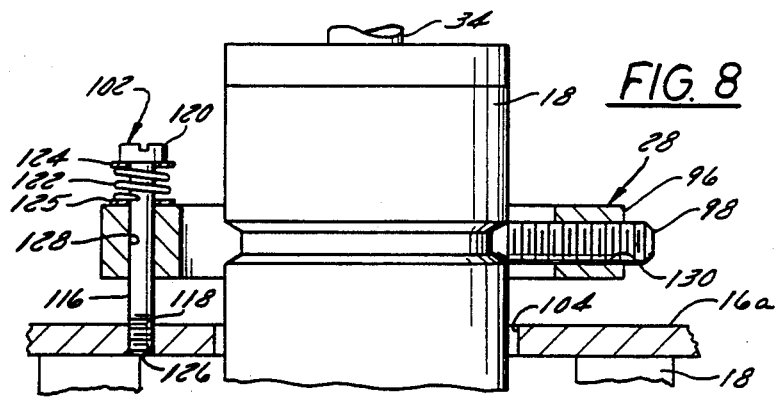
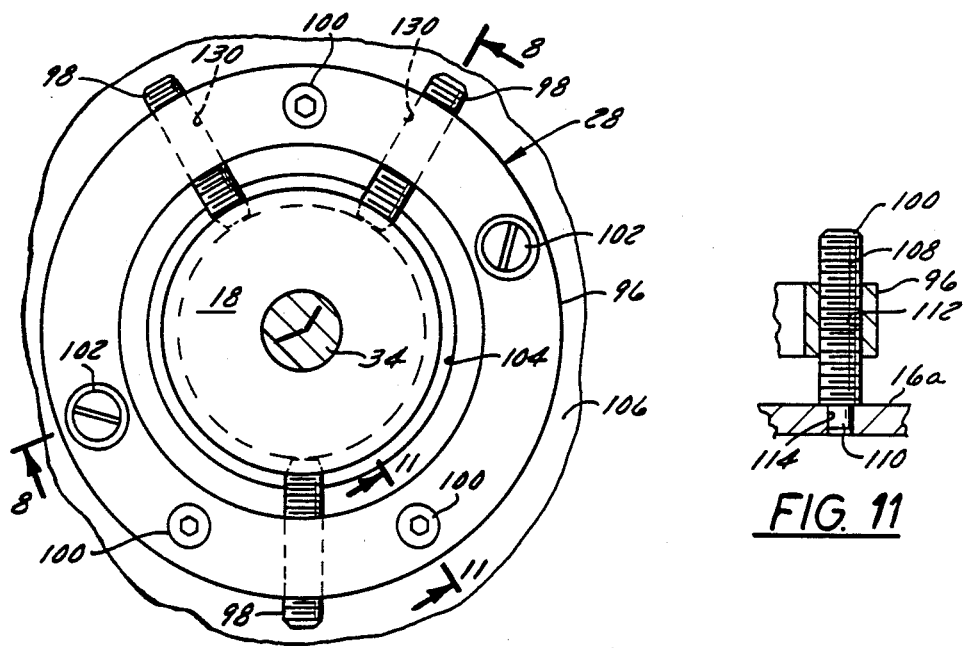
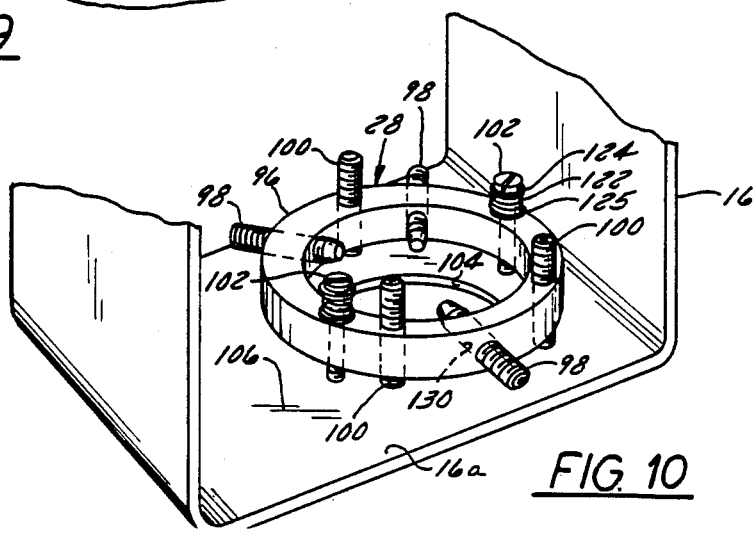

ADJUSTABLE VALVE LINKAGE

BACKGROUND OF THE INVENTION

The present invention relates generally to motorized valve actuators, and in particular, to actuators employing mechanisms which permit the application of a desired close-off force to an associated valve plunger against a valve seat.

In general, motorized valve actuators of the type described herein have been used in applications utilizing fluid conducting pipes, as in heating, ventilating and air conditioning systems and often actuators employed a motorized eccentric cam for providing linear movement of a valve plunger against an associated seat. A problem frequently associated with such mechanisms is the inability to adapt to different applications because of restricted movement of the valve stem. Furthermore, such systems are typically difficult to adjust manually in the event of failure of the motor to which they are attached.

An alternative approach was described in U.S. Pat. No. 4,549,446, issued to the present inventor on Oct. 29, 1985 and assigned to the same assignee as the present invention. The system therein described employed a rack and pinion mechanism for converting rotary motion, supplied by the shaft of the motor, to a linear force for application to the stem of the valve. Additionally, the motorized valve actuator described therein utilized overtravel of an output member relative to the valve seat to create a desired compressive force of the valve plunger against the seat. This resulted, in part, from the use of a coiled spring having a fixed compressive preload disposed between a pair of retaining spring cups. While this design overcame many of the disadvantages of earlier valve actuating systems, it was necessary to provide a different output member, having a different fixed compressive preload, if the particular valve or application desired required a different close-off force against the seat of the valve.

Finally, valve actuating mechanisms of the type described herein have often been difficult to adapt to a wide range of valve designs, sometimes necessitating additional expense as well as time delays in preparing the system for use with a different valve than was previously used. For example, in the '446 patent, described above, the valve was attached to the valve actuating assembly by placing the gland of the valve through an opening in a support bracket associated therewith, and then placing thereon a bushing and a lock nut. Different sized bushings and lock nuts, and possibly different sized brackets are then required depending on the particular valve selected.

These and other shortcomings of past designs are addressed by the valve actuator of the present invention.

SUMMARY OF THE INVENTION

The present invention describes, in general, a motorized valve actuating apparatus, and in particular, one capable of supplying a selectably adjustable close-off force to the valve associated therewith, and one which permits the attachment of valves of varying type and dimension.

DESCRIPTION OF THE DRAWING

A preferred exemplary embodiment of a valve actuating apparatus in accordance with the present invention will hereinafter be described in conjunction with the appended figures of the drawing, wherein like designations denote like elements, and:

FIG. 3 is a cross-sectional view of a movable actuating shaft of the valve actuating apparatus of FIG. 1, shown in an initial position, prior to the application of an actuating-effective force against an associated valve;

FIG. 4 is a second cross-sectional view of the movable actuating shaft of FIG. 3, shown after an actuating-effective force has been applied to the associated valve;

FIG. 5 is a third cross-sectional view of the movable actuating shaft of FIG. 3, shown after an adjustment has been made to a load adjusting assembly associated therewith;

FIG. 6 is a front elevation view of an outer casing associated with the load adjusting assembly; and FIG. 7 is a plan view of the load adjusting assembly of FIG. 6.

1. FIG. 8 is a partial, cross-sectional view of a mounting apparatus in accordance with the present invention, taken along angle 8—8 of FIG. 9;

FIG. 9 is a top plan view, partly in section, of a mounting apparatus according to the invention;

FIG. 10 is a partial perspective view of the mounting apparatus of FIG. 9, shown attached to an associated bracket; and FIG. 11 is a partial, cross-sectional view of a vertical adjustment axle in accordance with the present invention.

DETAILED DESCRIPTION OF AN EXEMPLARY EMBODIMENT

Figure 1:
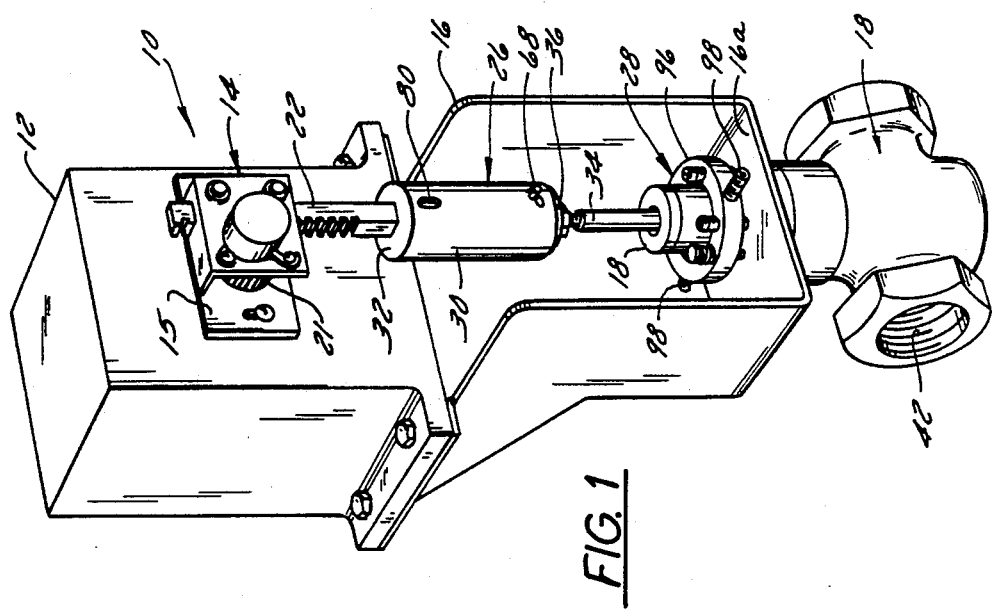
FIG. 1 is a perspective view of an exemplary valve actuating apparatus constructed in accordance with the present invention, shown in conjunction with a fluid flow control valve to be actuated thereby.

Referring to FIG. 1, a valve actuating mechanism 10, in accordance with the present invention, is shown therein comprising a motor housing 12, a power transfer mechanism 14, a support bracket 16 supporting motor 12, a valve 18 and a cylindrical adjustment assembly 26. Power transfer mechanism 14 includes a bracket 15 suitably fastened to motor housing 12 and journaled to receive a pinion gear 21 meshing with a rack 22, extending into cylindrical adjustment assembly 26 (FIG. 3). A valve coupling mechanism 28 is adjustably mounted on a horizontal shelf 16a of support bracket 16 and receives a valve stem 34 which extends from a cylindrical shaft member 24 (FIG. 3) into valve 18 mounted to and beneath shelf 16a. Adjustment assembly 26 includes an outer casing 30 having a top surface 32 which slidably receives rack 22 and a radially shaped valve connector 36 secured within the cylindrical walls thereof at the bottom.

Figure 2:
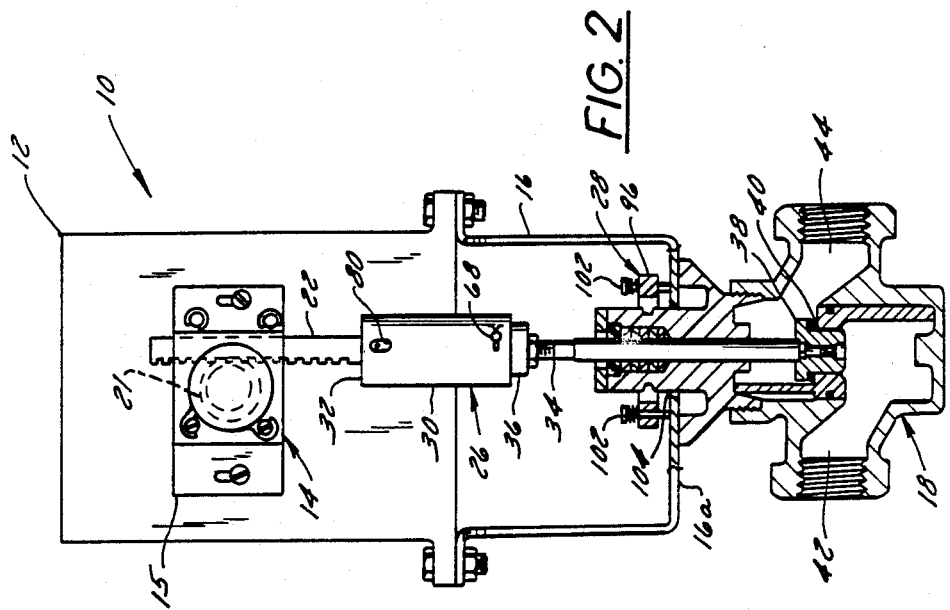
FIG. 2 is a front elevation view of the valve actuating apparatus of FIG. 1.

Valve stem 34, associated with valve 18, is releasably coupled to outer casing 30 by valve connector 36 and has a plunger 38 disposed at its distal end. As illustrated in FIG. 2, valve 18 further includes a valve seat 40, an entry chamber 42 and an exit chamber 44. Plunger 38 and seat 40 cooperate to permit or inhibit the flow of a generally fluid substance through valve 18. For example, assuming material (not shown) enters valve 18 through entry chamber 42, and further assuming plunger 38 is not in contact with seat 40 (i.e., valve 18 is open), then material is permitted to flow through an aperture which is surrounded by seat 40 into exit chamber 44. Once plunger 38 is brought into contact with seat 40, thus closing valve 18, material is prevented from flowing into exit chamber 44.

An actuating force is transferred to valve 18 from a motor (not shown) residing within motor housing 12. This is accomplished by the rotation of pinion gear 21 against rack 22 disposed proximal thereto. Rack 22 and adjustment assembly 26 then move downwardly along their longitudinal axes causing plunger 38 to move into abutting contact with seat 40.

In operation, when material enters valve 18 through entry chamber 42 when valve 18 is closed, it exerts a force against plunger 38. Thus, when plunger is brought into contact with seat 40, it is necessary to supply a force of sufficient magnitude in the opposite direction to the force of the material to prevent the material from escaping into exit chamber 44. Such force is often referred to as a "close-off force," and its value is a function of the pressure driving the material through valve 18. It is important to supply only a magnitude of force sufficient to prevent material from escaping into exit chamber 44, as excessive force may cause damage to valve seat 40. Thus, in operation, plunger 38 is brought into contact with seat 40 by an initial force supplied by the motor, as described above. Once initial contact is made, the motor actuator continues to rotate a distance sufficient to cause rack 22 to travel an additional distance (i.e., "overtravel"), for example, 1/10th of an inch, in the direction of valve seat 40. The force against valve seat 40 resulting from the overtravel of rack 22 is established and controlled through a predetermined setting of adjustment assembly 26, as will hereinbelow be described.

Referring to FIGS. 3 and 4 depicting various elements of adjustment assembly 26, it can be seen that rack 22 extends into assembly 26 and supports cylindrical shaft member 24. A fixed stop 46 is secured to shaft member 24 near the distal end thereof. A bushing 48, in the form of a cylinder having a radial flange 50 and a top or shoulder 52, is mounted about shaft 24 and abuts the top surface of stop 46. A biasing spring 56 is mounted around the lower end of shaft 24 and is contained between shoulder 52 and the lower end of a threaded adjustment sleeve 58, which is slidably disposed over shaft member 24. A helical spring 54 circumscribes bushing 48 and sleeve 58 and is contained between flange 50 and an adjustable stop 60.

Travel of radial flange 50 in the direction of valve 18 is initially limited by fixed stop 46 abutting against shoulder 52. Travel of adjustable stop 60 in the direction of rack 22 is initially limited by a radial flange 64 having a central aperture 65, which, in turn, is limited by a ridge 66, formed at the base of rack 22 at the point where rack 22 and cylindrical shaft member 24 are joined.

Surface 32 of casing 30 includes a central aperture 33 having a diameter which is greater than the diagonal distance of rack 22 along a plane which is substantially perpendicular to the longitudinal axis of cylindrical shaft member 24, but which is less than the diameter of radial flange 64. As a result, outer casing 30 is able to float freely about adjustment assembly 26.

Resilient spring 54, disposed between adjustable stop 60 and radial flange 50, preferably develops an initial preload value, e.g., a force of about 40 lbs.

Valve connector 36 is disposed within outer casing 30, and secured to a lower portion of casing 30 by a connecting pin 68. A channel 70, having a diameter approximately that of connecting pin 68, is disposed through a central portion of valve connector 36 along its radial axis. Casing 30 includes a pair of mating apertures 72, 74, formed to permit insertion of connecting pin 68. Connecting pin 68 is first inserted into aperture 72, is next pushed through channel 70, and finally exits through aperture 74. The length of connecting pin 68 is greater than the diameter of outer casing 30 by an amount sufficient to permit insertion of cotter pins or the like though apertures 75 disposed in exposed opposite end sections of connecting pin 68. Any suitable means for attaching valve connector 36 to casing 30 may be employed. For example, cooperating sections of valve connector 36 and casing 30 may each be threaded so that valve connector 36 could be screwed into the base of casing 30.

Valve connector 36 further includes a longitudinally extending threaded aperture 76 centrally disposed for mating engagement with a similarly threaded portion of valve stem 34. Connecting pin 68 serves to limit the distance valve stem 34 can be inserted into valve connector 36 when inserted in the manner described; this prevents stem 34 from interfering with the operation of adjustment assembly 26.

Movable actuating shaft 24, adjustment assembly 26, valve connector 36 and outer casing 30 all preferably function as a unitary structure when travel of associated valve stem 34 and plunger 38 is unopposed by another force (i.e., the force exerted by seat 40 when plunger 38 makes contact) or by a force less than the preload value associated with adjustment assembly 26. Thus, for example, when valve 18 is open, and an initial force is supplied by the motor, the distance traveled by plunger 38 (until plunger 38 makes initial contact with seat 40) is the same as the corresponding distance traveled by rack 22.

Once plunger 38 comes into contact with seat 40, plunger 38, valve stem 34, valve connector 36, outer casing 30, bushing 48 and radial flange 50 are inhibited from any further travel in the direction of valve 18. Rack 22, however, continues to travel a predetermined distance which may be, by way of example, approximately 1/10th inch. In order for rack 22 to travel this predetermined distance, a force in excess of the preload value must be present. Once the force associated with the preload is overcome, travel of rack 22 continues which, in turn, results in additional compression of spring 54, creating additional force against seat 40 by plunger 38. The final force, i.e., close-off force, applied to valve seat 40 by plunger 38, is equal to the preload value plus the force which would result from compressing resilient spring 54 the predetermined distance. The latter value would, of course, depend on the rate of the spring chosen. A suitable spring rate in a preferred embodiment of the present invention is 560 lbs/inch. Thus, for example, using 1/10th of an inch of travel as the predetermined distance, approximately 56 lbs of force would be produced in addition to the preload force for a total (close-off) force of 96 lbs. In practice, the motor is typically able to supply substantially greater force than would be required.

FIG. 4 illustrates valve actuating mechanism 10 after moving the predetermined distance beyond the point where plunger 38 contacted seat 40. In this position, fixed stop 46 is no longer in contact with radial flange 50; it has, in fact, been displaced the predetermined distance into a cavity 78 disposed within bushing 48, formed between radial flange 50 and shoulder 52. As a result, travel of radial flange 50 is now in effect limited by the position of valve seat 40.

In operation, it is necessary for the operator to initially adjust the motor so that the desired overtravel will result when valve 18 is actuated. Referring briefly to FIG. 2, outer casing 30 includes an aperture 80, the top of which is suitably aligned with radial flange 64. Aperture 80 is preferably includes a central region which is dimensioned lengthwise to be approximately equal to the predetermined distance, i.e., 1/10th inch, along the longitudinal axis of casing 30. Initially, the operator causes the motor to actuate until plunger 38 first makes contact with seat 40. When this occurs, the motor is again actuated until radial flange 64 reaches the center of aperture 80, at which time the operator adjusts the motor so that it will not actuate beyond this point. In this manner, the desired overtravel is set to the predetermined distance.

In the highly preferred embodiment illustrated in the present drawing, the operator may selectively adjust the preload value, and by so doing, adjust the final compressive force (i.e., close-off force) applied to valve seat 40. Referring to FIGS. 4 and 5, threaded adjustment sleeve 58 is slidably disposed over cylindrical shaft member 24, and biased in the direction of adjustable stop 60 by biasing spring 56. Adjustable stop 60 is threaded along its inner periphery for mating engagement with adjustment sleeve 58. Initially, the top of threaded adjustment sleeve 58 abuts against the bottom of the threaded inner portion of adjustable stop 60, but is not engaged therewith. As best illustrated with reference to FIG. 5, turning adjustable stop 60 causes it to become engaged with adjustment sleeve 58, thereby causing adjustment sleeve 58 to move into the inner threaded portion of adjustable stop 60. In this manner, the distance between adjustable stop 60 and radial flange 50 may be selectively varied, which in turn changes the compression force resulting from the confinement of spring 54, resulting in a change to the preload value. Once adjustment sleeve 58 has been inserted completely through adjustment adjustable stop 60, adjustment sleeve 58 comes into contact with radial flange 64 and is thereafter limited thereby in the same manner that adjustable stop 60 was initially limited.

Adjustment sleeve 58 additionally includes a guide slot 82 through which a spring pin 84 projects outwardly from cylindrical shaft member 24. The cooperation of slot 82 and pin 84 prevents rotational movement of adjustment sleeve 58 (when adjustable stop 60 is turned), while allowing adjustment sleeve 58 to move along the longitudinal axis of cylindrical shaft member 24. Turning adjustable stop 60 a sufficient amount to cause, e.g., a 1/10th of an inch reduction in the distance between adjustable stop 60 and radial flange 50 (i.e., compressing resilient spring an additional 1/10th of an inch) increases the preload value to about 96 lbs (i.e., 40 plus 56). The resulting close-off force is then 152 lbs, which is the sum of the preload value and the additional compressive force resulting from compressing resilient spring 54 an additional 1/10th of an inch due to overtravel of rack 22.

In practice, outer casing 30 is not typically removed from adjustment assembly 26 during the operation of valve actuating mechanism 10. Thus, it is necessary for the operator to rotate adjustable stop 60 about adjustment sleeve 58 without physically handling either. Referring to FIG. 7, the diameter of the enclosure formed by outer casing 30 is preferably greater than outermost points 86 of adjustable stop 60 along a plane substantially perpendicular to the longitudinal axis of cylindrical shaft member 24. As seen in FIG. 3, the entire outer periphery of adjusting screw 62 is threaded for mating engagement with a similarly threaded bore or channel 88 extending radially from a central portion 90 of adjustable stop 60 through a face 92. At its opposite end, channel 88 terminates into adjustment sleeve 58. Adjusting screw 62 is preferably dimensioned to be approximately the same length as channel 88. The distance from face 92 to the inner wall of casing 30, in turn, is less than the length of adjusting screw 62. As seen in FIGS. 5 and 6, outer casing 30 includes a longitudinally extending adjustment slot 94 disposed over a portion of outer casing 30 which is coincident with the longitudinal path of adjusting screw 62. Adjusting screw 62 may be turned by use of any suitable means, e.g., an allen wrench, so that it extends outwardly from outer casing 30 through adjustment slot 94. When in use with a motor assembly, rotational movement of cylindrical shaft member 24 (and thus adjustment sleeve 58) is inhibited. Since outer casing 30 is able to rotate freely about adjustment assembly 26, turning outer casing 30 causes adjustable stop 60 to rotate about adjustment sleeve 58. Once the desired adjustment has been effected, adjusting screw 62 may be screwed back into channel 88 until it engages adjusting sleeve 58. In this manner, unwanted movement of adjustable stop is further inhibited.

The exposed outer surface of casing 30 preferably includes a scale for providing indicia of the preload value to the operator. When setting adjustment assembly 26, adjustable stop 60 is moved along adjustment sleeve 58 until the desired preload value has been selected; adjusting screw 62, the position of which corresponds to adjustable stop 60, then provides a visual indication of the preload value.

In the above description and accompanying Figures, valve 18 is described and illustrated as being actuated (i.e., closed) in a single direction, i.e., away from rack 22. In practice, however, valve actuating mechanism 10 may also be used with valves which are closed in the opposite direction, or in either direction concurrently.

Referring to FIGS. 8, 9 and 10, valve coupling mechanism 28 suitably comprises an annular collar 96, radially projecting axles 98 retractably secured to collar 96, vertical adjustment axles 100 retractably secured to collar 96 and threaded fasteners 102.

Support bracket 16 suitably includes an aperture 104 disposed on a face 106; aperture 104 is preferably dimensioned to accommodate the largest valve used. Collar 96 and aperture 104 are coaxially disposed in spaced apart relation. The internal diameter of collar 96 is preferably substantially coincident with the diameter of aperture 104.

Valve actuating mechanism 28, in accordance with the present invention, may be adapted for use with valves of varying design. Thus, a number of attachment methods (associated with the specific valve selected), including, for example, valve bonnet jam nuts, bonnet grooves, or tapered bonnet surfaces, may be accommodated. The vertical position of each of these attachment surfaces, relative to the position of the valve stem, often varies, depending upon the specific valve chosen. Accordingly, it may be necessary to vary the spatial relationship between face 106 and collar 96. In a highly preferred embodiment of the present invention, this is achieved by adjusting vertical adjustment axles 100, as will be described.

Referring to FIG. 11, vertical adjustment axles 100 suitably comprise an upper threaded cylindrical section 108 and a coaxially disposed lower smooth-surfaced cylindrical section 110 having a lesser diameter than upper section 108. The height of lower section 110 is preferably equal to the thickness of bracket 16 along shelf 16a.

Collar 96 suitably includes a plurality of vertically disposed apertures 112 (corresponding to the number of vertical adjustment axles desired), threaded for mating engagement with upper sections 108. Face 106 includes an equal number of apertures 114 having a diameter which is slightly greater than lower section 110, but less than upper section 108. The axial orientation of apertures 112 corresponds with that of apertures 114. Thus, when in place within collar 96, lower sections 110 are able to nest in apertures 114 while upper sections 108 engage apertures 112. Turning vertical adjustment axles 100 while so engaged results in a change in the vertical position of collar 96 relative to face 106. Treating the plane which is perpendicular to the vertical axle of collar 96 as the reference plane, any desired spacial relationship can be established between the reference plan and the plane of face 106 by adjusting all or any combination of vertical adjustment axis 100. In other words, the reference plane may be established so that it is parallel with the plane of the attachment surface of valve 18 even if that surface is not parallel with the plane of face 106. Adjustment may be made utilizing any suitable means, e.g., an allen wrench.

Collar 96 is removably secured to bracket 16 by threaded fasteners 102, which prevents lower sections 110 from becoming disengaged from apertures 114. Referring specifically to FIG. 8, threaded fasteners 102 each suitably comprise a shaft 116 having a threaded region 118 and a head 120, and a biasing spring 122 disposed between first and second bushings 124,125. Threaded region 118 is preferably dimensioned to be the same length as the thickness of shelf 16a. Face 106 of bracket 16 suitably includes apertures 126 threaded for mating engagement with threaded region 118 of threaded fasteners 102. Collar 96 includes aperture 128, the axial orientation of which correspond to aperature 126.

In practice, each threaded fastener 102 is first inserted through biasing spring 122 and bushings 124,125 until first bushing 124 contacts head 120. Threaded fasteners 102 are next inserted completely through apertures 128 and then into apertures 126. Turning threaded fasteners 102 causes threaded region 118 to engage aperture 126. As may be recalled, lower section 110 of axles 100 nests in apertures 114 but does not become engaged therewith. Bushing 125 is urged into engagement with collar 96 by biasing spring 122, which then in effect urges lower cylindrical section 110 into contact with apertures 114. In this manner, the desired spatial relationship between collar 96 and bracket 116 is maintained.

Once the vertical position of collar 96 has been established, valve 18 is next inserted through both aperture 104 and the inner region of collar 96. Valve stem 34 is next attached to valve connector 36 in the manner described above. Radially projecting axles 98 are then adjusted to secure valve 18 in place, as will be described.

Collar 96 suitably includes channels 130, threaded for mating engagement with radially projecting axles 98. Axles 98 are inserted through channels 130 into the inner region of collar 96, and then brought into contact with the throat of valve 18 as best illustrated in FIG. 8. The inwardly directed end of axles 98 are preferably tapered to engage valve 18 and thus prevent shifting once it has been secured in place. In the illustrated embodiment, three axles are shown. Additional axles may, however, be used. The positional orientation of axles 130 with respect to each other may be, for example, 0°-150°-210°, 0°-120°-240° or any other suitable combination. In a highly preferred embodiment of the present invention illustrated herein, the positional relationship of axles 130 is 0°-150°-210°, as this permits each axle to be arranged so as to be most accessible to the operator during operation of valve actuating mechanism. In this manner, the effective circumferential region of the inner portion of collar 96 may be varied to accommodate valves having attachment surfaces of varying diameter (i.e., the diameter of the plane passing through the attachment surface). This same positional orientation is also applicable with respect to axles 100.

It is to be understood that the above description is only of a preferred exemplary embodiment of the present invention; and that the invention is not limited to the specific forms shown. Thus, by way of nonlimiting example, adjustment sleeve 56 may be fixed on cylindrical shaft member 24. Other modifications to the specific form shown may additionally be made without departing from the spirit of the invention and which fall within the scope of the invention as expressed in the appended claims.

I claim:

1. A valve actuating mechanism for actuating a valve having a plunger and seat, and providing a close-off force of predetermined magnitude against said seat, comprising:
    (a) means for urging said plunger into engagement with said seat with a predetermined initial force, said urging means including a movable actuating shaft releasably coupled to a valve stem projecting outwardly of said valve;
    (b) resistive means responsive to said urging means when said plunger is urged against said seat for generating a resistive force of a magnitude and direction such that said close-off force against said seat is less than said initial force by a predetermined amount; and
    (c) adjusting means for selectively varying said resistive force by said predetermined amount, including:
        a bushing having a radial flange, slidably mounted on said shaft; and
        means including a stop disposed on said shaft near one end thereof for limiting movement of said bushing in one direction; and an adjustable stop disposed on said shaft; said resistive means positioned between said radial flange and said adjustable stop, said resistive means generating a force of increasing magnitude as said adjustable stop is moved closer to said bushing.

2. The valve actuating mechanism of claim 1, wherein said resistive means comprises a resilient spring.

3. The valve actuating mechanism of claim 2, wherein said adjusting means further comprises:
    (a) an adjustment sleeve, disposed on said shaft between said bushing and said adjustable stop; and
    (b) a biasing spring, disposed over said shaft between said adjustment sleeve and said bushing, for biasing said adjustment sleeve towards said adjustable stop.

4. The valve actuating mechanism of claim 3, wherein said adjustable stop includes and outwardly projecting adjusting screw.

5. The valve actuating mechanism of claim 4, further including an outer casing surrounding said shaft, said outer casing including a longitudinal adjustment slot disposed over at least a portion of said adjustment sleeve, said adjustment slot having a width greater than the distal end of said adjustment screw.

6. The valve actuating mechanism of claim 5, wherein said adjustment sleeve includes a longitudinally extending guide slot.

7. The valve actuating mechanism of claim 6, wherein said shaft further comprises a spring pin disposed within said guide slot of said adjustment sleeve for securing against rotation of said adjustment screw while allowing said adjustment screw to move radially along said shaft.

8. A valve actuating mechanism for actuating a valve having a plunger and seat, and providing a close-off force of predetermined magnitude against said seat, comprising:
  (a) means for urging said plunger into engagement with said seat with a predetermined initial force;
  (b) resistive means responsive to said urging means when said plunger is urged against said seat for generating a resistive force of a magnitude and direction such that said close-off force against said seat is less than said initial force by a predetermined amount;
  (c) adjusting means for selectively varying said resistive force by said predetermined amount;
  (d) A bracket having an aperture generally centrally disposed on a face of said bracket; and
  (e) means releasably mounted to said bracket for securing said valve to said bracket, wherein said securing means comprises:
    a collar having an adjustable internal circumferential region disposed proximal said aperture and adapted to receive a portion of said valve;
    means for adjusting the internal circumferential region of said collar;
    means secured to said collar for adjusting the distance of said collar in relation to said face of said bracket; and
    means for releasably securing said collar to said bracket.

9. The valve actuating mechanism of claim 8, wherein said means for adjusting the internal circumferential region of said collar comprises a plurality of axles retractably secured to said collar having a direction of travel substantially parallel to the radial plane of said collar.

10. The valve actuating mechanism of claim 9, wherein said means for adjusting the distance of said collar in relation to said bracket comprises a plurality of members adjustably secured to said collar having a direction of travel substantially perpendicular to said radial plane.

11. The valve actuating mechanism of claim 10, wherein said means for securing said collar to said bracket includes a threaded fastener and means for biasing the direction of travel of said collar in relation to said bracket.

12. A valve actuating mechanism for actuating a valve having a plunger, a seat and an attachment surface, and providing a close-off force of predetermined magnitude against said seat, comprising:
  (a) means for urging said plunger into engagement with said seat with a predetermined initial force;
  (b) resistive means responsive to said urging means when said plunger is urged against said seat for generating a resistive force of a magnitude and direction such that said close-off force against said seat is less than said initial force by a predetermined amount;
  (c) adjusting means for selectively varying said resistive force by said predetermined amount;
  (d) bracket means fixedly secured to said valve actuating mechanism for allowing movement of said valve actuating mechanism relative to said valve;
  (e) mounting means for positioning said valve relative to said bracket means including collar means for releaseably and adjustably securing said valve to said bracket means, means for maintaining said collar means a predetermined distance from said bracket means and means for selectively varying said predetermined distance.

* * * * *